United States Patent [19]

Meyer

[11] Patent Number: 4,929,463

[45] Date of Patent: May 29, 1990

[54] PROCESS FOR ASEPTIC PREPARATION OF PARTICULATE FOOD PRODUCTS

[75] Inventor: Richard S. Meyer, Tacoma, Wash.

[73] Assignee: Curtice-Burns, Inc., Rochester, N.Y.

[21] Appl. No.: 317,828

[22] Filed: Mar. 1, 1989

Related U.S. Application Data

[63] Continuation-in-part of Ser. No. 231,592, Aug. 10, 1988, abandoned, which is a continuation of Ser. No. 929,061, Nov. 7, 1986, abandoned.

[51] Int. Cl.$^5$ .............................................. A23L 3/18
[52] U.S. Cl. .................................... 426/521; 426/531; 426/589
[58] Field of Search ............... 426/521, 646, 589, 615, 426/531

[56] References Cited

U.S. PATENT DOCUMENTS 3,992,148  11/1976  Shore et al. .......................... 426/521

Primary Examiner—George Yeung
Attorney, Agent, or Firm—Christensen, O'Connor, Johnson & Kindness

[57] ABSTRACT

A process for the aseptic preparation of particulate food products containing large and minor particulate components. The large and minor particulate components are separately heated within a single processing system at a temperature and time sufficient to sterilize each component. The large component may be acidified prior to heating and recombined with a heated minor component at basic pH to form a sterilized food product at neutral pH.

10 Claims, 1 Drawing Sheet

PROCESS FOR ASEPTIC PREPARATION OF PARTICULATE FOOD PRODUCTS

This application is a continuation-in-part application based on prior copending application Ser. No. 231,592, filed Aug. 10, 1988, now abandoned, which is a continuation application of prior application Ser. No. 929,061, filed on Nov. 7, 1986, and abandoned Oct. 14, 1988.

FIELD OF THE INVENTION

This invention relates to the aseptic processing of food products, in particular to food products containing particulate components.

BACKGROUND OF THE INVENTION

Aseptic food products are produced by heating the food product in a sterile environment to a predetermined temperature for a length of time sufficient to eliminate pathogens; that is, microorganisms that can cause spoilage of the food product. The food product must then be transferred to and stored, for example, in a sterile container or package to prevent the reentry of microorganisms over time. Conventional aseptic processing systems typically employ a continuous sterile flow path, including holding tanks, pumps, heat exchangers for both heating and cooling and packaging machinery.

The time necessary at a given temperature for processing a container or unit of food for the purpose of sterilization is measured in terms of an f-value, which is the equivalent time in which a product is held at temperature T to reduce microbial populations. The term $f_o$ indicates the time in minutes required to destroy a given number of organisms of a reference strain at a temperature of 250° F. when the Z value is 18° F. A Z value is the number of degrees Fahrenheit required for a specific death curve to pass through one log cycle (i.e., change by a factor of ten). An $f_o$ of three minutes has been found to be a safe minimum public health sterilization value for low acid food products. When the pH of a food is between 4.6 and 6.0, the $f_o$ may be reduced to between one and two minutes.

In current aseptic processing systems, all components of a food product are heated to the same temperature for the same amount of time. Temperature level and time are dictated by the food component that requires the highest temperature and the longest period of time to cook to achieve an acceptable level of sterilization required by public health standards. This requirement leads to overcooking of some components because different components react to temperature levels and cooking time in various ways, depending upon the exact makeup of the components of the product.

Current aseptic processing systems typically process food products containing large particulate components to the system at a relatively slow rate using a typical $f_o$ of 60 (sixty minutes at 250° F. or its equivalent). Food products containing minor particulates, or liquid, such as sauces, can be processed at relatively fast rates using a typical $f_o$ on the order of 6.0 (six minutes at 250° F. or its equivalent). Thus, when products containing a large particulate component, for example, chunks of meat, are subject to heating at high temperatures for relatively long periods of time to sterilize the large particulates, other components, such as sauces and vegetables, may undergo undesirable changes in flavor, color, texture and may lose nutrient value.

SUMMARY OF THE INVENTION

Accordingly, the present invention provides a process for the aseptic preparation of food products having particulate components, for example, large and minor particulates, by heating the components separately at a temperature and time sufficient for sterilization of each component. The components are heated separately within a single aseptic processing system, with the larger particulate component being subjected to heating for a longer time when the minor particulate component. The separately heated components are then recombined to form a single food product. In another aspect of the invention, the larger particulate component is acidified to lower the time at a given temperature needed to sterilize that component. The larger particulate component is then combined with a minor particulate and the pH adjusted to a desired pH. The pH adjusting agent can be added to the minor particulate component or to the resulting mixture of the two components.

In another aspect of the present invention, a stream of the large particulate component is treated separately from a stream of the minor particulate component at a temperature and time sufficient for sterilization of each component stream. The large particulate component includes a plurality of large particles all flowing at substantially the same velocity. The minor particulate component includes a plurality of minor particles all flowing at substantially the same velocity. The respective uniform velocities of the particles in the large particulate component stream, and the particles in the minor particulate component stream ensures that certain specific particles are not treated excessively so as to overcook or scorch the overexposed particles or that other particles will be underexposed and not sterilized.

The uniform velocities of the respective particles also provide a basis for proving that each of the particles has been uniformly treated (i.e., exposed to the sterilization temperature for a minimum period of time). Proof of uniform treatment of the particles is a factor that the United States Department of Agriculture and the Food and Drug Administration consider in their decision to approve or disapprove the commercial implementation of a proposed aseptic processing system for food products.

BRIEF DESCRIPTION OF THE DRAWINGS

The details of a typical embodiment of the present invention will be described in connection with the accompanying drawing in which the figure is a schematic illustration of an aseptic processing system incorporating parallel flow lines and other features for sterilization particulate foods according to the present invention.

DETAILED DESCRIPTION OF THE INVENTION

Figure 1:
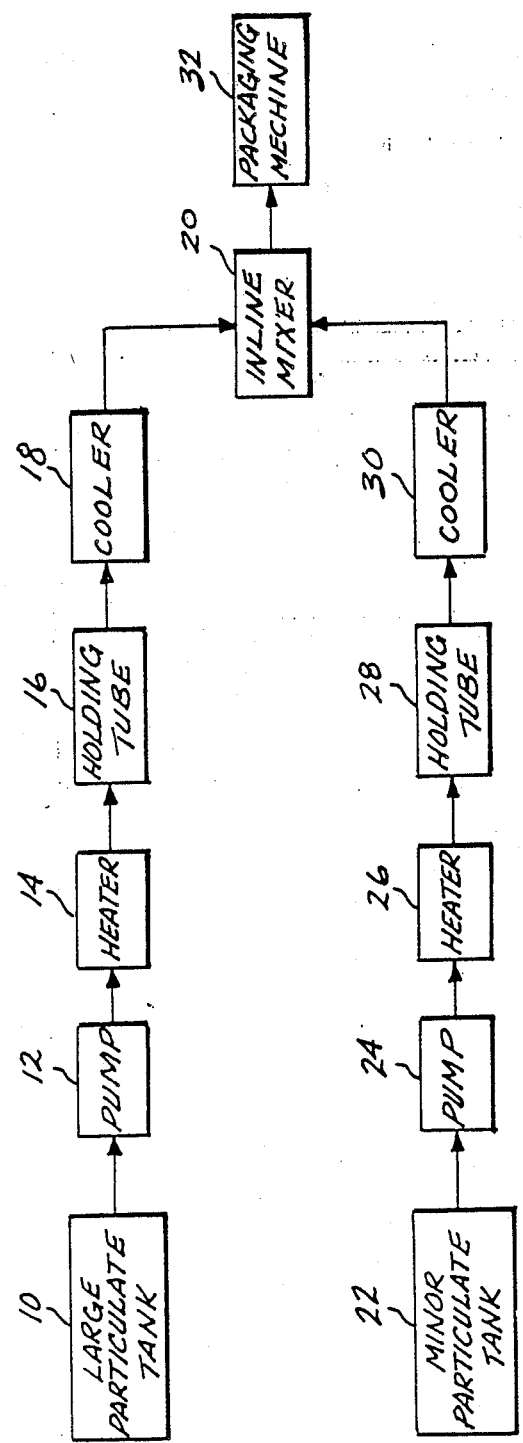

The present invention provides a new process for the aseptic preparation of food products containing particulate components including those comprising both a large particulate component and a minor particulate component in a single system, with the optimal application of heat at the minimum time and temperature necessary to sterilize each of the components. As utilized herein, particulate food products are those containing both large food particles, normally having a diameter on the order of 0.1 inch or greater and small or minor food particles having a diameter of less than 0.1 inch.

The term large particulate component refers to a product stream containing large food particles, generally in a liquid media. The large particulate component can also contain small or minor food particles. The minor particulate component is a product stream carrying no particles or only minor food particles having a diameter less than 0.1 inch and can include sauces, pastes and liquids.

Referring now to the FIGURE, an aseptic processing system constructed in accordance with the present invention includes a large particulate tank 10 in which a large particulate component is placed prior to processing through the aseptic processing system. A large particulate component is pumped from the large particulate tank via pump 12 into a heater 14, for instance a swept surface heat exchanger or an ohmic heating system. Once the food is heated to a desired temperature, it is transferred to a holding tube 16. The residence time of the food in the holding tube is dependent upon the rate at which the larger particulate material is being pumped via pump 12 through the system. Once the large particulate component has been exposed to heat in the holding tube for the required time, it is passed through a cooler 18 and into an in-line mixer 20. A minor particulate component is placed in a minor particulate tank 22 forming a part of a processing stream parallel to the large particulate processing stream. The minor particulate component is pumped via pump 24 into a heater 26 where it is heated to the desired temperature. It is then conveyed through the minor particulate holding tube 28 through cooler 30 and into in-line mixer 20 where it is combined with the large particulate component. From the in-line mixer 20, the material is forwarded to packaging machine 32 where it is aseptically packaged to provide an end product.

In accordance with the present invention, a large particulate component is preferably processed at a higher $f_o$ than the minor particulate component. This allows complete sterilization, for example, of chunky meat products, that form part of the large particulate component. At the same time, the minor particulate component is processed at a low $f_o$ so as not to harm the delicate nature of the minor particulate component such as a sauce that contains materials that are susceptible to scorching, for example. The aseptic processing technology employed in connection with the present invention is generally conventional with the exception that the processing streams are divided into a large particulate stream and a parallel small particulate stream and each of the streams are treated in a differrent manner prior to a combination in the in-line mixer.

In accordance with the present invention, large particulate components, for example, those containing chunky meat products having a diameter ranging from ¾ to 1 inch in a fluid media, can be heated at an $f_o$ ranging from 40 to 60, as measured in the fluid media. The actual internal $f_o$ in the meat particulate would be 3 to 6. The $f_o$ in the fluid media would have to be increased as the chunk diameter increases beyond 1 inch. The chunk composition may also require upward modifications of $f_o$. Similarly, a minor particulate process stream can be heated at an $f_o$ ranging from 3 to 12. This $f_o$ range is equivalent to heating a minor particulate component to a temperature of 250° F. for 4 to 6 minutes. One of ordinary skill will readily recognize that additional aseptic processing lines can be added to the system to accommodate, for example, components having different sizes of particulates or different viscosities that need to be processed for different time periods or at different temperatures. To accommodate an intermediate particulate stream, another parallel processing line similar to that used on a large particulate stream would be employed. After the intermediate particulate stream is cooled, it would be combined with other product streams in the in-line mixture and forwarded onto the aseptic packaging machine.

It has been found that a preferred method of carrying out the present invention involves treating a stream of the large particulate component to sterilize the large particulate components by causing the plurality of large particles in the large particulate stream to all flow at substantially the same velocity. Similarly, a stream of the minor particulate component is treated to sterilize the minor particulate components by casing the minor particles in the minor particulate component stream to all flow at substantially the same velocity. By causing substantially all the large particles to flow at substantially identical velocities and substantially all the minor particles at substantially identical velocities, the residence time distribution of the particles in the respective large particle and minor particle heater and hold tubes is narrowed and, accordingly, the risk that certain specific particles will be overexposed or underexposed to the sterilizing temperature is greatly reduced.

One way to cause particles to flow at substantially the same velocity relative to the other particles in the respective particulate component streams is to include a viscous matrix in the component stream to help narrow the particle velocity distribution within the heater and hold tube. That is, by including a viscous matrix in the component streams, the viscous matrix servies to narrow the distribution of the velocity of the individual particles in the component streams when compared to the distribution of the velocity of the individual particles in the component streams when the viscous matrix is not present. Materials that may be used to provide the viscous matrix include heat stable thickeners that will not burn or scorch, or impart a bad flavor or texture to the particle component stream. Some specific examples of heat stable thickeners include starch, gums, or proteins such as soy beam isolate or cellulose-based thickeners such as AVOCEL®, available from The Dow Chemical Co. The heat stable thickener should be uniformly dispersed throughout the particulate component streams to provide a matrix having a relatively uniform viscosity.

Another factor in providing a component stream in which the particles are flowing at substantially the same velocity is to use particles that have substantially the same dimensions. If the particulate component stream includes particles having a wide distirubtion of particle size, e.g., large and small paticles, the larger particles will not pass through the heater and hold tube at the same velocity as the smaller particles in the component stream. Because adequate sterilization of the particles is a function of the time that the particles are held at the sterilization temperature, the length of the old tube must be sufficient to ensure that the particle residence time in the hold tube is sufficient to sterilize all the particles. Although the particles that are flowing faster may be held at the sterilization temperature long enough to ensure satisfactory sterilization, the particles flowing at a slower rate will take longer to pass through the hold tube and, thus will be exposed to the sterilization temperature for an excessive amount of time. The slower flowing particles will be sterilized; unfortunately, they will also be subjected to overcooking or scorching. At the other extreme, if the residence time in the hold tube is based on the sterilization of the slower moving particles, the faster moving particles may be underexposed and not adequately sterilized.

Although the particles in the respective large and minor component streams preferably have the same dimensions, it is not required that they have the same composition. More importantly, the particles in the respective component streams should have substantially the same $f_o$ values so that the time required to sterilize the particles at a given temperature are relatively the same. Particles having substantially similar $f_o$ values that are passed through the heater and hold tube at the same velocity will be exposed to near identical sterilization conditions. Accordingly, adequate sterilization of all the particles can be more accurately and safely predicted based on the particles that require the longest period of exposure to the sterilization temperature while reducing the risk that some of the particles will be overexposed. Because of the narrower distribution of particle velocity through the heater and the hold tube, it is not necessary to overexpose portions of the component stream to ensure that all the particles are adequately sterilized. That is, the period of time that the particles are held at the sterilization temperature will adequately sterilize substantially all the particles, and any heat exposure above what is necessary to sterilize the particles will be minimized, thus reducing the risk of overcooking or scorching some of the particles. Another benefit of narrowing the distribution of particle velocity relates to reducing the risk that some particles will be flowing through the hold tube at a velocity that reduces the residence time in the hold tube to below the time required to adequately sterilize the particle. By narrowing the velocity distribution, one can more reliably predict that all particles will be in the hold tube a period of time sufficient to sterilize the particle.

Naturally, particles having the same dimensions and the same $f_o$ value are easily provided by using particles of the same composition and thus, this is the most preferred way of carrying out the method in accordance with the present invention. In fact, aseptically processed food products containing multiple particulate components would be best produced by separately sterilizing individual streams containing particles of the same composition and the same size and then combining the streams after sterilization.

With regard to the magnitude of the velocities applicable in the context of the present invention, an exemplary range includes about three to five feet per minute, although other velocities may be equally applicable. Particle integrity, length of the heater, length of the hold tube, energy requirements, the ability to provide the particles, capacity to mix the particle streams and capacity to package the product must be considered in determining the particle velocity. Because conventional food products normally have liquid components that range in viscosity from about 500 to about 10,000 centipoise, it is preferred that the viscous matrix used to control the velocity of the particles in the component streams be maintained within this range. Although this range of viscosity is preferred, it is possible that other values of viscosity may be equally applicable in certain instances. For larger particles, where the ratio of particle diameter to the diameter of the hold tube or heater is at least about 0.1, the velocity of the individual particles will be substantially the same when the particle velocity approaches the high end of the range recited above, and the viscosity of the viscous matrix approaches the low end of the range described above.

For smaller particles where the ratio of the particle diameter to the diameter of the heater or hold tube is less than about 0.1, the velocity of the individual particles will be substantially the same when the velocity approaches the lower end of the range described above and the viscosity approaches the higher end of the range described above. Given the fact that the large particulate component stream and the minor particulate component stream will be flowing at different velocities, a continuous process system may still be designed wherein although the large particles in the large particulate component stream are flowing at a higher velocity than the minor particles in the minor particulate component stream, the volumetric flow rates may be adjusted so that the appropriate volumes of the component streams may be continuously mixed in an in-line mixer or similar mixing device.

In another embodiment of this invention, prior to placing the large particulate component into the aseptic processing system, the pH of the large component can be adjusted to 6.0, preferably to a pH in the range between a pH of 4.2 and 5.5, using an acid such as acetic acid, gluco-deltalactone, lactic acid, citric acid or phosphoric acid. Other suitable acids can also be employed. Lowering the pH in this manner reduces the $f_o$ necessary to heating the large particulate component to provide biological stability. Depending on the degree of acidification, the acidified component can be heated at an $f_o$ of from 23% to 90% less than a nearly neutral material. For example, a component acidified to a pH range of from 4.2 to 5.5 need be heated to an $f_o$ of from 0.3 to 2.3 to achieve biological stability. At the same time, the pH of the minor particulate component can be adjusted to basic conditions, preferably to a pH between 8.0 to 10.0, and more preferably to a pH between 8.4 and 9.8 using a base such as sodium hydroxide, sodium bicarbonate, potassium hydoxide or calcium hydroxide. Other suitable bases can also be employed. The pH is adjusted sufficiently basic so that when the two components are combined, a final food product having a neutral pH (e.g., on the order to 7.0), or other desired end pH is achieved. Alternatively, the minor particulate component can also be acidified to decrease processing time. In the event the minor component is acidified, the end product can be neutralized in or after the in-line mixer, or the individual components can be pH adjusted prior to mixing to provide an end product of desired pH.

In yet another aspect of the invention, some products produced in aseptic processing systems contain certain enzymes that recover from the heat shock of aseptic systems and can cause off flavors and other adverse effects on the final food product. The component or components of the product that contain these enzymes can be separated to form a distinct group and processed in a separate aseptic line in a manner that will eliminate the adverse effects of the enzyme. For example, the enzyme component could be treated at different temperatures or a different pH to eliminate effects. Alternatively, antienzyme enzymes or chemical inactivators can be added to the enzyme component to eliminate adverse effects. Once the enzyme component is treated, it can be combined with the other component or components in an in-line mixer.

Using the process of the present invention, the flavor, color and texture of all components of a food product are preserved, while the appropriate processing is rendered to each component to render it sterile. The process of the present invention is further illustrated by the following example which is presented to illustrate the present invention and to assist one of ordinary skill in making and using the same. The example is not intended in any way to either limit the scope of the disclosure or the protection afforded by the grant of Letters Patent hereon.

EXAMPLE 1

A test food product is formulated into a large particulate component and a minor particulate component. The large particulate component contains 251 pounds of beef, 220 pounds of diced potatoes, 100 pounds of diced carrots, 200 pounds of water and 10 pounds of starch. The largest particles in the large particulate components are the meat and potato particles having a mean diameter of 1 inch. The minor particulate component contains 250 pounds of water, 60 pounds of thickening and flavoring ingredients, for example starch, salt, granulated onions and various spices. The total weight of the minor particulate component is 310 pounds. The largest particle in the minor particulate component has a mean diameter of 0.1 inch. A processing system similar to that generally described above is employed to sterilize the two components. Large particulate components are put into the large particulate food tank and the minor particulate components into the minor particulate food tank. The large particulate component is pumped into a heater where it is heated to 274° and forwarded onto the holding tube. The residence time in the holding tube is 3 minutes at a temperature of between 278° and 273°. Thereafter, the large particulate component is forwarded to the cooler in preparation for in-line mixing. Similarly, the minor component is placed in the minor particulate tank and pumped into a heater and heated to a temperature of 260° F. For the heater, the minor particulate component is advanced to the holding tube where it is retained for 1–4 minutes. The minor particulate component is then forwarded to a cooler and to an in-line mixer where it is combined with a large particulate component. From the in-line mixer, the final product is aseptically packaged. A microbiologically stable end product results. The heating and residence time for the large particulate component corresponds to an $f_o$ of 40 (measured in the liquid phase) and for a minor particulate component to an $f_o$ of 5.

EXAMPLE II

The procedure of Example 1 is repeated with the exception that the large particulate component has its pH adjusted from 4.6 to 4.7 by the addition of acetic acid. Similarly, the minor particulate component is pH adjusted by the addition of sodium hydroxide to adjust its pH from 9.6 to 9.7. In this run, the large particulate component is heated to 270° held in the holding tube for approximately 1-2 minutes. This corresponds to an $f_o$ of 16 (measured in the liquid phase). A minor particulate component is heated to 260° and held in the holding tube for 0.5 minutes. This heating residency time corresponds to an $f_o$ of 1.2 for the minor particulate component. The components are then independently cooled and mixed in an in-line mixer. A resulting end product has a pH of 7.0. The end product is aseptically packaged into bags to produce a microbiologically stable end product.

As will be apparent to those skilled in the art, the present invention may be embodied in forms other than those specifically disclosed above without departing from the spirit or essential characteristics of the invention. For example, the invention is not limited to two parallel flow streams. If desired three or more of flow streams can be employed with processing at different $f_o$ levels and, if desired, differing pH levels. Particular embodiments of the present invention described above are therefore to be considered in all aspects as illustrative and not restrictive. The scope of the Letters Patent granted hereon is to be limited only by the definitions set forth in the appended claims and equivalents thereof.

The embodiments of the invention in which an exclusive property of privilege is claimed are defined as follows:

1. A process for the aseptic preparation of food products containing a large particulate component and a minor particulate component comprising:
   (a) treating a stream of said large particulate component to sterilize said component, said large particulate component comprising a plurality of large particles, all flowing at substantially the same velocity;
   (b) treating a stream of said minor particulate component separately from said large particulate component to sterilize said minor particulate component, said minor particulate component comprising a plurality if minor particles, all flowing at substantially the same velocity; and,
   (c) combining said treated large particulate component and said treated minor particulate component for packaging.

2. The process of claim 1, wherein said stream of said large particulate component includes a viscous matrix of heat-stable thickeners.

3. The process of claim 1, wherein said stream of said minor particulate component includes a viscous matrix of heat-stable thickeners.

4. The process of claim 1, wherein said large particulate component includes a plurality of different food products, each large particle having substantially the same $f_o$ value.

5. The process of claim 1, wherein said minor particulate component includes a plurality of different food products, each minor particle having substantially the same $f_o$ value.

6. The process of claim 4, wherein said large particles have substantially equal dimensions.

7. The process of claim 5, wherein said minor particles have substantially equal dimensions.

8. The process of claim 1, wherein said large particulate component is a single food product.

9. The process of claim 1, wherein said minor particulate component is a single food product.

10. The process of claim 1, wherein said minor particulate component comprises a component selected from the group consisting of sauces, liquids, and pastes.

* * * * *

UNITED STATES PATENT AND TRADEMARK OFFICE
CERTIFICATE OF CORRECTION

PATENT NO. : 4,929,463

DATED : May 29, 1990

INVENTOR(S) : Richard S. Meyer

It is certified that error appears in the above-identified patent and that said Letters Patent is hereby corrected as shown below:

| Column | Line | |
|---|---|---|
| 2 | 11 | "when" should be --than-- |
| 4 | 16 | "casing" should be --causing-- |
| 4 | 33 | "servies" should be --serves-- |
| 4 | 53 | "distirubtion" should be --distribution-- |
| 4 | 54 | "paticles" should be --particles-- |
| 4 | 59 | "old" should be --hold-- |
| 7 | 31 | "components" should be --component-- |

In the Drawing:

FIGURE 1   "MECHINE" should be --MACHINE--

Signed and Sealed this

Twenty-first Day of January, 1992

Attest:

HARRY F. MANBECK, JR.

*Attesting Officer*   *Commissioner of Patents and Trademarks*